United States Patent
Shumway et al.

(10) Patent No.: US 11,624,019 B2
(45) Date of Patent: Apr. 11, 2023

(54) OIL-BASED FLUID LOSS COMPOSITIONS

(71) Applicant: Halliburton Energy Services, Inc., Houston, TX (US)

(72) Inventors: William Walter Shumway, Spring, TX (US); Hui Zhou, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 132 days.

(21) Appl. No.: 17/110,789

(22) Filed: Dec. 3, 2020

(65) Prior Publication Data

US 2022/0177767 A1    Jun. 9, 2022

(51) Int. Cl.
  *E21B 21/00* (2006.01)
  *C09K 8/035* (2006.01)
  *C09K 8/502* (2006.01)

(52) U.S. Cl.
  CPC .............. *C09K 8/502* (2013.01); *C09K 8/035* (2013.01); *E21B 21/003* (2013.01)

(58) Field of Classification Search
  None
  See application file for complete search history.

(56) References Cited

U.S. PATENT DOCUMENTS

| | | | |
|---|---|---|---|
| 4,421,655 A * | 12/1983 | Cowan | C09K 8/32 507/108 |
| 4,710,586 A | 12/1987 | Patel et al. | |
| 8,524,640 B2 | 9/2013 | Patel et al. | |
| 8,871,690 B2 | 10/2014 | Patel et al. | |
| 2013/0331302 A1 | 12/2013 | Patel et al. | |
| 2014/0051606 A1 * | 2/2014 | Dobson, Jr. | C04B 18/22 507/117 |
| 2015/0152313 A1 | 6/2015 | Picco et al. | |
| 2019/0055452 A1 * | 2/2019 | Mohammed | C09K 8/032 |
| 2021/0395597 A1 * | 12/2021 | Daniloff | E21B 21/003 |

FOREIGN PATENT DOCUMENTS

| WO | 2004061267 A1 | 7/2004 |
|---|---|---|
| WO | 2013126138 A1 | 8/2013 |
| WO | 2017192642 A1 | 11/2017 |

OTHER PUBLICATIONS

PCT App. No. PCT/US2020/063058, "International Search Report and Written Opinion", dated Aug. 31, 2021, 10 pages.

* cited by examiner

*Primary Examiner* — Anuradha Ahuja
(74) *Attorney, Agent, or Firm* — Kilpatrick Townsend & Stockton LLP

(57) ABSTRACT

Compositions with modified tannins can be used in wellbore operations. A composition can include an oil, a modified tannin, a dimer fatty acid, an aqueous liquid, and an emulsifier, where the material is injectable into a wellbore. The modified tannin may be treated with a primary amine, secondary amine, tertiary amine, or quaternary amine. The compositions may be used as drilling fluids having enhanced yield point and fluid loss control properties.

17 Claims, 3 Drawing Sheets

OIL-BASED FLUID LOSS COMPOSITIONS

FIELD

The present disclosure relates generally to fluid compositions used in wellbore operations. More specifically, but not by way of limitation, this disclosure relates to oil-based fluid compositions with enhanced fluid loss control in wellbore operations.

BACKGROUND

Oil-based compositions may be used in the drilling industry as drilling fluids. During drilling operations, a drilling fluid is generally used to cool the drilling bit, control pressure within the wellbore, and suspend and transport drill cuttings from the wellbore to the surface. Controlling or minimizing loss of drilling fluid from the wellbore into porous features of the subterranean matrix is generally desirable. The subterranean matrix may become destabilized by excessive fluid incursion and the wellbore may become compromised. Fluid loss into the subterranean matrix can be lessened by forming a filter cake within the wellbore. The drilling fluid can be formulated with materials that promote formation of a filter cake upon initial spurt loss of the drilling fluid to the subterranean matrix.

Clay derivatives and chemical additives can be used in drilling fluids to modify rheological properties of the fluid, to convey viscosity to the fluid, and to promote formation of a filter cake during drilling. The rheological properties of a fluid can be a consideration in the selection of a drilling fluid. Rheological properties can include viscosity, gel strength, yield point, tau zero, among others.

DETAILED DESCRIPTION

Certain aspects and features of the present disclosure relate to fluid compositions used in wellbore operations. The fluid compositions may be a drilling fluid that is injectable into a wellbore. The fluids may include an oil, a modified tannin, a fatty acid, an aqueous liquid, and an emulsifier. The tannin may be modified with a primary, secondary, or tertiary amine. The modified tannin, when combined with a dimer fatty acid or dimer/trimer fatty acid, may have a synergistic effect on the fluid loss control properties of the fluid. For example, the fluid may provide reduced fluid loss compared to a comparable fluid with the modified tannin alone. In some examples, the fluid composition is an invert emulsion. And, the oil-based fluid compositions may include one or more emulsifiers to stabilize the aqueous liquid within the continuous oil phase.

The viscosity of a drilling fluid may be important for some applications, such as where the drilling fluid helps to maintain the integrity of the wellbore and aids in drilling by transporting cuttings and cooling the drilling bit during operation. Oil-based fluids according to some examples may have increased viscosity, increased gel strength, increased yield point, or increased tau zero compared to a fluid with the modified tannin alone. Gel strength is a measure of the shear stress of a drilling fluid after the fluid has set quiescently for a period of time and aids in the suspension of drilled solids within the fluid column when the fluid is not being circulated. In some cases, the fluid loss of the oil-based fluids may be reduced.

Illustrative examples are given to introduce the reader to the general subject matter discussed herein and are not intended to limit the scope of the disclosed concepts. The following sections describe various additional features and examples with reference to the drawings in which directional descriptions are used to describe the illustrative aspects, but, like the illustrative aspects, should not be used to limit the present disclosure.

Figure 1:
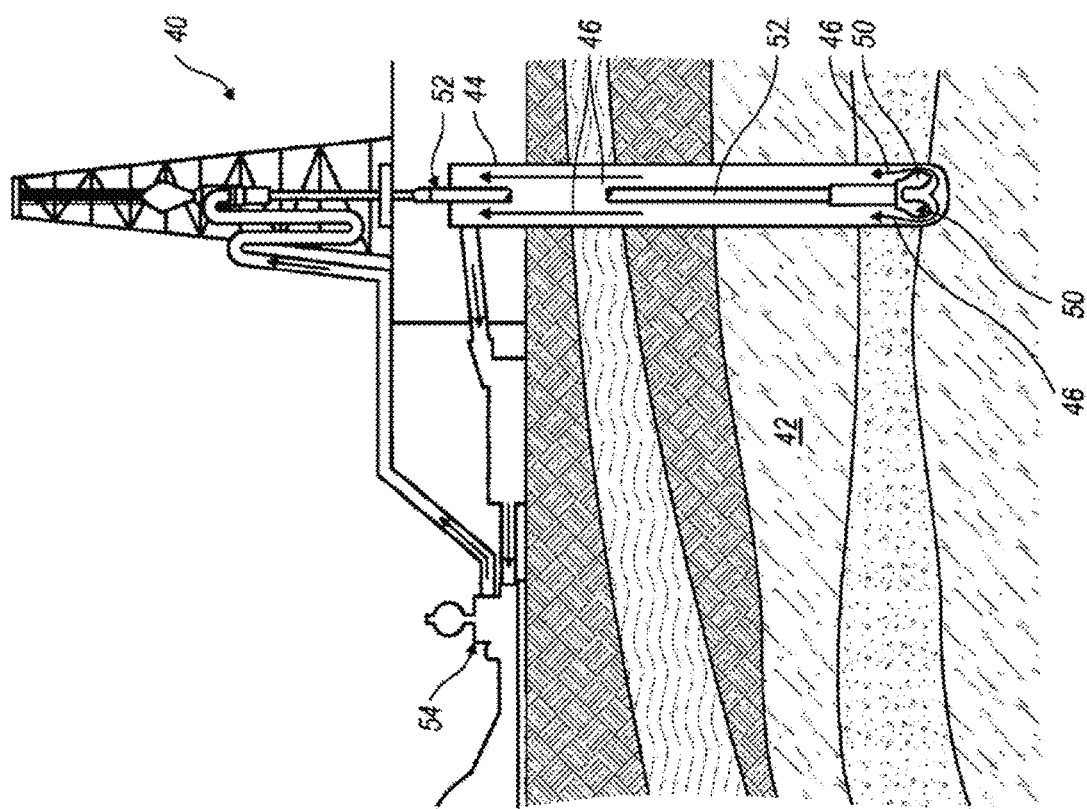
FIG. 1 is an illustrative schematic of a drilling assembly using a drilling fluid according to one example of the present disclosure.

FIG. 1 illustrates a wellbore 44 being drilled through a subterranean formation 42. A drill rig 40 can be used for drilling the wellbore 44. A drill bit 50 may be mounted on the end of a drill string 52 that includes multiple sections of drill pipe. The wellbore 44 may be drilled by using a rotary drive at the surface to rotate the drill string 52 and to apply torque and force to cause the drill bit 50 to extend through wellbore 44. The drilling fluid may be displaced through the drill string 52 using one or more pumps 54. The drilling fluid may be circulated past the drill bit 50 and returned to the surface through the annulus of wellbore 44, as indicated by arrows 46, thereby removing drill cuttings (e.g., material such as rock generated by the drilling) from the wellbore 44. Although not shown, additional conduits besides drill string 52 may also be disposed within wellbore 44.

The subterranean formation 42 may contain permeable zones through which the drilling fluid may migrate from wellbore 44 into the subterranean formation 42. These permeable zones may be, for example, fractures, fissures, streaks, voids, vugs, and the like. The presence of such permeable zones in the subterranean formation 42 may cause the circulation of the drilling fluid in wellbore 44 to be lost such that the fluid does not flow back to the surface of the earth.

The amount of drilling fluid lost within a well through terrain voids or formation pores may be reduced with fluid loss control additives. Reduced fluid loss may be advantageous to lower operating costs, increase borehole stability, protect formation from fluid infiltration and fines migration, maintain fluid properties, provide a protective filter cake to the borehole, reduce differential sticking, and limit potential environmental impacts of drilling the wellbore. In some cases, the fluid loss may be at least 40 percent lower than that of traditional drilling fluids that do not include both a modified tannin and a dimer or trimer fatty acid. In some cases, the fluid loss may be at least 60 percent lower than that of traditional drilling fluids that do not include both a modified tannin and a dimer fatty acid.

Fatty acids may be added to drilling fluids as a rheology modifier, for example to increase viscosity, but without a benefit to fluid loss properties. Tannins may be used in traditional drilling fluids as a fluid loss control additive. In some examples, the fluid loss performance may be enhanced when modified tannins are used in combination with a dimer fatty acid, a trimer fatty acid, or both a dimer fatty acid and a trimer fatty acid. The synergistic effect of the combination of modified tannins and the dimer or trimer fatty acid on fluid loss was unexpected. The rheology of the oil-based fluid compositions do not account for the significant difference in fluid loss. Fluids with similar rheological properties that include modified tannins but do not include the dimer or trimer fatty acid have higher fluid loss than a fluid that includes the synergistic combination of modified tannins and a dimer or trimer fatty acid.

The synergistic effect may be observed when the fluid includes a tannin treated or modified with a primary, secondary, or tertiary fatty amine. For example, the tannin may be treated with a secondary fatty amine made from C14 to C24 side chains (e.g., C16 side chains). In some examples, the synergistic effect of the combination on fluid loss is reduced with a tannin modified with a quaternary amine. The synergistic effect of the combination on fluid loss may be greater with a tannin modified with a primary or secondary amine and a dimer/trimer fatty acid.

A tannin may be modified by adding about 5 wt. % to about 35 wt. % of an amine to the tannin (e.g., 10 wt. % to 30 wt. %, 15 wt. % to 25 wt. %, or 16 wt. % to 22 wt. %). For example, the amount of amine added to a tannin may be about 5 wt. %, 6 wt. %, 7 wt. %, 8 wt. %, 9 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, or 35 wt. %.

The fluid compositions may include a continuous oil phase and a discontinuous aqueous phase. The oil of the continuous phase may be a diesel oil, a mineral oil, a synthetic oil, an ester, a paraffin, or other oil known to persons skilled in the art. The aqueous liquid may be selected from fresh water, sea water, brackish water, water soluble alcohol, or brine. The fluid composition may include at least one emulsifier. In some examples, lime may be used to activate the emulsifier. In some examples, unmodified tannins are water soluble. Tannins modified with an amine may be hydrophobic and enable the modified tannins to be dispersible or soluble in oil.

In some examples, the fluid composition can include a polymer, a viscosifying agent, a weighting agent, a salt, gilsonite, clay, a base, or combinations thereof. Polymer additives and viscosifying agents can increase the viscosity of a fluid, and improve suspension of solids and emulsion stability. Viscosifying agents can include, for example, polymers, amorphous fibrous materials, and organophilic clay materials. In some examples, the fluid compositions may be shear thinning fluids that may aid in the suspension of solids. These non-Newtonian fluids exhibit a viscosity that decreases with increasing shear stress, i.e., exhibit a lower viscosity at higher shear rates and a higher viscosity at lower shear rates as compared to Newtonian fluids.

Weighting agents, high-specific gravity and finely divided solid materials, may be used to increase the density of drilling fluid. Salts, acids, and bases can increase the stability of an emulsion. In some examples, salts including calcium chloride may be included in the fluid composition. Calcium carbonate may be used as a bridging agent to plug voids within the wellbore. In some examples, the fluid composition includes lime or calcium hydroxide. Other agents or additives for suspension, oil-wetting, fluid loss or filtration control, may be included in the fluid compositions.

Figure 2:
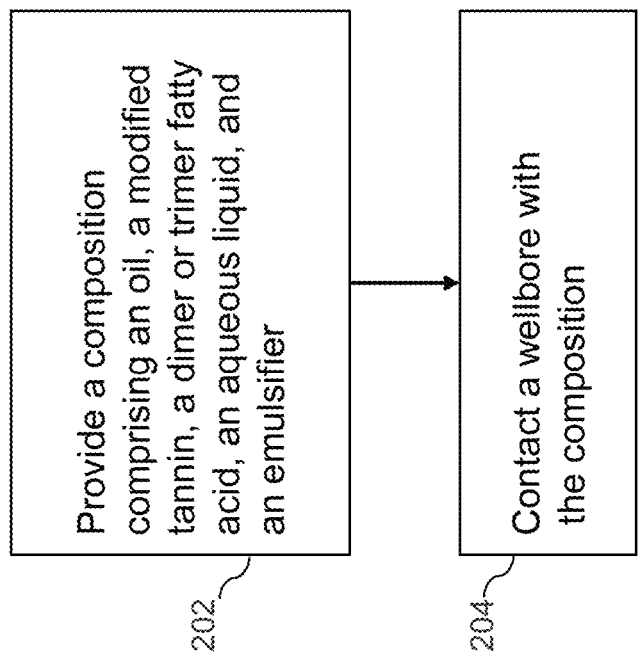
FIG. 2 is a flowchart diagram of a process for drilling a formation in well system using a drilling fluid according to one example of the present disclosure.

FIG. 2 is a flow-chart diagram of a method of injecting a fluid composition in a wellbore according to one or more embodiments described herein. The method includes providing a composition comprising an oil, a modified tannin, a dimer or trimer fatty acid, an aqueous liquid, and an emulsifier 202 and contacting a wellbore with the composition 204.

Figure 3:
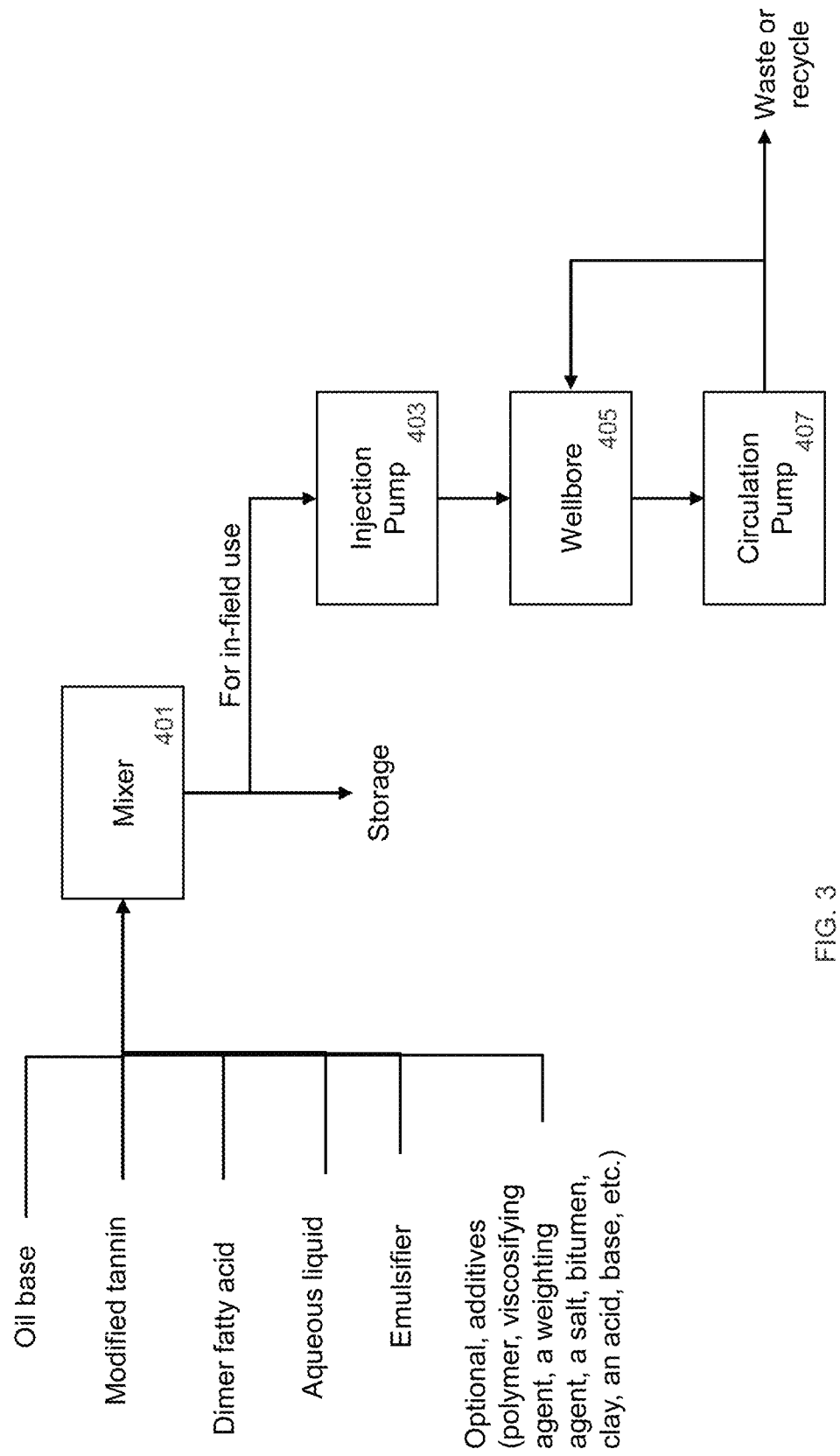
FIG. 3 is a block diagram of a system for injecting a drilling fluid in a well system according to one example of the present disclosure.

Various systems to inject a wellbore with a fluid composition may be configured. As shown in FIG. 3, a system may include an injection pump 403 to inject the fluid composition into a wellbore 405. A system can include a circulation pump 407 to circulate the fluid composition within a wellbore. Optionally, a system can include a mixer 401 that contacts at least a modified tannin, a dimer or dimer/trimer fatty acid, an aqueous liquid, and an emulsifier, with an oil base to form a fluid composition. The fluid composition may be stored or directed to in-field use.

EXAMPLES

In determining the properties set forth in the tables, samples of the fluid compositions were formulated using a standard multimixer at 6,000 rpm and then rolled at 300° F. to 360° F. as indicated for 16 hours (AHR, after hot roll), or static aged for 16 hours at 300° F. to 400° F. (ASA, after static aged). Measurements were taken with the fluids at 120° F. or 150° F., as indicated. High Pressure High Temperature (HPHT) fluid loss was measured at 350° F. and 500 psid differential pressure. The reported HPHT fluid loss is corrected (2×) to account for the size of the filter used.

Example 1

Fluid samples were prepared according to the formulations of Table 1, each using a tannin modified with a secondary amine. The samples were tested for rheological properties and HPHT fluid loss.

TABLE 1

| Sample | 1 | | 2 | |
|---|---|---|---|---|
| Oil 1, lb/bbl | 164.6 | | 164.6 | |
| Emulsifier 1, lb/bbl | 8 | | 8 | |
| Emulsifier 2, lb/bbl | 4 | | 4 | |
| Lime, lb/bbl | 5 | | 5 | |
| Water, lb/bbl | 52.2 | | 52.2 | |
| $CaCl_2$, lb/bbl | 18.1 | | 18.1 | |
| Organophilic clay 1, lb/bbl | 3 | | 3 | |
| Modified tannin 2, lb/bbl | 6 | | 6 | |
| Dimer/trimer fatty acid 1, lb/bbl | 0 | | 1 | |
| $CaCO_3$, lb/bbl | 10 | | 10 | |
| Synthetic drill solids, lb/bbl | 20 | | 20 | |
| Weighting agent, lb/bbl | 330 | | 330 | |
| Rheology @ 120° F. | AHR-300° F. | ASA-300° F. | AHR-300° F. | ASA-300° F. |
| 600 rpm | 58 | 58 | 65 | 64 |
| 300 rpm | 31 | 30 | 36 | 36 |
| 6 rpm | 3 | 3 | 5 | 4 |
| 3 rpm | 3 | 3 | 4 | 4 |
| GELS 10 sec, lbs/100 ft$^2$ | 4 | 4 | 7 | 7 |

TABLE 1-continued

| Sample | 1 | | 2 | |
|---|---|---|---|---|
| GELS 10 min, lbs/100 ft² | 6 | 6 | 9 | 9 |
| GELS 30 min, lbs/100 ft² | 7 | 6 | 10 | 10 |
| HPHT Fluid Loss 30 min, mL | 2 | 2.8 | 0.5 | 0.9 |
| HPHT Fluid Loss 2 × 30 min, mL | 4 | 5.6 | 1 | 1.8 |

The viscosity measurements of Sample 2, which included a dimer/trimer fatty acid, were higher than the measurements of Sample 1, which was free of a dimer/trimer fatty acid. Both fluids had a low viscosity at the low shear condition of 3 rpm. Drilling solids were added to simulate in-field conditions. The gel strength measurements of Sample 2 were greater than that of Sample 1. The fluid loss measurements of Sample 2 were significantly different from the fluid loss observed for Sample 1. Sample 2, which included a tannin modified with a secondary amine and a dimer/trimer fatty acid had fluid loss levels that were more than 50 percent less than that of Sample 1.

Example 2

Fluid samples were prepared according to the formulations of Table 2, each using a tannin modified with a secondary amine. The samples were tested for rheological properties and HPHT fluid loss.

TABLE 2

| Sample | 3 | | 4 | |
|---|---|---|---|---|
| Oil 1, lb/bbl | 154 | | 154 | |
| Emulsifier 2, lb/bbl | 12 | | 12 | |
| Lime, lb/bbl | 3 | | 3 | |
| Modified tannin 2, lb/bbl | 7 | | 7 | |
| Water, lb/bbl | 75 | | 75 | |
| CaCl$_2$, lb/bbl | 25 | | 25 | |
| Organophilic clay 1, lb/bbl | 9 | | 9 | |
| CaCO$_3$, lb/bbl | 10 | | 10 | |
| Dimer/trimer fatty acid 2, lb/bbl | 2 | | 0 | |
| Weighting agent, lb/bbl | 215.1 | | 215.1 | |
| Rheology @ 120° F. | AHR-350° F. | ASA-350° F. | AHR-350° F. | ASA-350° F. |
| 600 rpm | 60 | 57 | 61 | 59 |
| 300 rpm | 36 | 36 | 35 | 33 |
| 200 rpm | 25 | 27 | 24 | 23 |
| 100 rpm | 16 | 18 | 14 | 14 |
| 6 rpm | 4 | 7 | 3 | 3 |
| 3 rpm | 4 | 6 | 3 | 3 |
| PV, cP | 24 | 21 | 26 | 26 |
| YP, lbs/100 ft² | 12 | 15 | 9 | 7 |
| GELS 10 sec, lbs/100 ft² | 7 | 9 | 4 | 4 |
| GELS 10 min, lbs/100 ft² | 10 | 13 | 6 | 7 |
| GELS 30 min, lbs/100 ft² | 10 | 13 | 7 | 7 |
| HPHT Fluid Loss 30 min, mL | 1.5 | 1 | 4.8 | 3.8 |
| HPHT Fluid Loss 2 × 30 min, mL | 3 | 2 | 9.6 | 7.6 |

The viscosity measurements of Sample 3, which included a dimer/trimer fatty acid, were similar to the measurements of Sample 4, which was free of a dimer/trimer fatty acid. Both fluids had a low viscosity at the low shear condition of 3 rpm. The gel strength measurements of Sample 3 were greater than that of Sample 4. The fluid loss measurements of Sample 3 after hot roll and after static aging were significantly lower than the fluid loss observed for Sample 4. Yield point values showed the inverse relationship, with the fluid including both the modified tannin and dimer/trimer fatty acid having higher yield point values. Sample 3 which included both a tannin modified with a secondary amine and a dimer/trimer fatty acid had fluid loss levels that were more than 60 percent lower than the fluid loss of the sample with only the modified tannin.

Example 3

Fluid samples were prepared according to the formulations of Table 3, each using a tannin modified with a secondary amine. The samples were tested for rheological properties and HPHT fluid loss.

TABLE 3

| Sample | 5 | | 6 | |
|---|---|---|---|---|
| Oil 2, bbl/bbl | 0.611 | | 0.611 | |
| Emulsifier 3, bbl | 4 | | 4 | |
| Emulsifier 4, lb/bbl | 8 | | 8 | |
| High Temp. Emulsifier, lb/bbl | 0.5 | | 0.5 | |
| Lime, lb/bbl | 7 | | 7 | |
| Modified tannin 2, lb/bbl | 10 | | 10 | |
| Fluid loss polymer, lb/bbl | 4 | | 4 | |
| Polymer on starch, lb/bbl | 1.5 | | 1.5 | |
| Water, bbl/bbl | 0.162 | | 0.162 | |
| $CaCl_2$, lb/bbl | 17.4 | | 17.4 | |
| Amorphous/fibrous material, lb/bbl | 8 | | 8 | |
| Organophilic clay 2, lb/bbl | 5 | | 5 | |
| Dimer/trimer fatty acid 1, lb/bbl | 0 | | 1.5 | |
| $CaCO_3$, lb/bbl | 30 | | 30 | |
| Weighting agent, lb/bbl | 114.7 | | 114.7 | |
| Clay, ppb | 30 | | 30 | |
| Rheology @ 150° F. | AHR-356° F. | ASA-392° F. | AHR-356° F. | ASA-392° F. |
| 600 rpm | 52 | 85 | 77 | 134 |
| 300 rpm | 29 | 51 | 46 | 95 |
| 6 rpm | 4 | 9 | 11 | 38 |
| 3 rpm | 4 | 8 | 11 | 36 |
| GELS 10 sec, lbs/100 ft² | 7 | 14 | 22 | 48 |
| GELS 10 min, lbs/100 ft² | 11 | 22 | 32 | 53 |
| GELS 30 min, lbs/100 ft² | 12 | 23 | 32 | 59 |
| HPHT Fluid Loss 30 min, mL | 4 | 6.8 | 1.1 | 2.9 |
| HPHT Fluid Loss 2 × 30 min, mL | 8 | 13.6 | 2.2 | 5.8 |

The viscosity measurements of Sample 6, which included a dimer/trimer fatty acid, were greater than the measurements of Sample 5, which was free of a dimer/trimer fatty acid. The gel strength measurements of Sample 6 were greater than that of Sample 5. The fluid loss measurements after hot roll of Sample 5 were significantly lower than the fluid loss observed for Sample 6. Sample 6 that included both a tannin modified with a secondary amine and a dimer/trimer fatty acid had fluid loss that was more than 70 percent lower than the fluid loss of the sample with only the modified tannin.

Example 4

Fluid samples were prepared according to the formulations of Table 4, each using a tannin modified with a primary amine. The samples were tested for rheological properties and HPHT fluid loss.

TABLE 4

| Sample | 7 | | 8 | |
|---|---|---|---|---|
| Oil 2, bbl/bbl | 0.611 | | 0.611 | |
| Emulsifier 3, bbl | 8 | | 8 | |
| Emulsifier 4, lb/bbl | 4 | | 4 | |
| High Temp. Emulsifier, lb/bbl | 0.5 | | 0.5 | |
| Lime, lb/bbl | 7 | | 7 | |
| Modified tannin 1, lb/bbl | 8 | | 8 | |
| Fluid loss polymer, lb/bbl | 4 | | 4 | |
| Polymer starch, lb/bbl | 1.5 | | 1.5 | |
| Water, bbl/bbl | 0.162 | | 0.162 | |
| $CaCl_2$ | 17.4 | | 17.4 | |
| Amorphous/fibrous material, lb/bbl | 8 | | 8 | |
| Organophilic clay 2, lb/bbl | 5 | | 5 | |
| Dimer/trimer fatty acid 1, lb/bbl | 0 | | 3 | |
| $CaCO_3$, lb/bbl | 30 | | 30 | |
| Weighting agent, lb/bbl | 114.7 | | 114.7 | |
| Clay, ppb | 30 | | 30 | |
| Rheology @ 150° F. | AHR-356° F. | ASA-392° F. | AHR-356° F. | ASA-392° F. |
| 600 rpm | 55 | 70 | 85 | 155 |
| 300 rpm | 30 | 39 | 53 | 111 |
| 200 rpm | 21 | 27 | 41 | 91 |
| 100 rpm | 13 | 15 | 29 | 67 |
| 6 rpm | 3 | 3 | 16 | 41 |
| 3 rpm | 3 | 2 | 16 | 41 |
| PV, cP | 25 | 31 | 32 | 44 |
| YP, lbs/100 ft² | 5 | 8 | 21 | 67 |
| GELS 10 sec, lbs/100 ft² | 5 | 3 | 35 | 62 |
| GELS 10 min, lbs/100 ft² | 9 | 12 | 55 | 66 |
| GELS 30 min, lbs/100 ft² | 11 | 14 | 59 | 59 |
| HPHT Fluid Loss 30 min, mL | 0.5 | 2.3 | 0.4 | 1.2 |

TABLE 4-continued

| Sample | 7 | | 8 | |
|---|---|---|---|---|
| HPHT Fluid Loss 2 × 30 min, mL | 1.0 | 4.6 | 0.8 | 2.4 |

The viscosity measurements of Sample 8, which included a dimer/trimer fatty acid, were higher than the measurements of Sample 7, which was free of a dimer/trimer fatty acid. The gel strength measurements of Sample 8 were greater than that of Sample 7. The fluid loss measurements of Sample 8 after hot roll and after static aging were lower than the fluid loss observed for Sample 7. Yield point values showed the inverse relationship, with the fluid including both the modified tannin and dimer/trimer fatty acid having much higher yield point values. Sample 8 which included both a tannin modified with a secondary amine and a dimer/trimer fatty acid had fluid loss levels that were about 50 percent lower than the fluid loss of the sample with only the modified tannin.

Example 5

Fluid samples were prepared according to the formulations of Table 5, each using a tannin modified with a tertiary amine. The samples were tested for rheological properties and HPHT fluid loss.

TABLE 5

| Sample | 9 | | 10 | |
|---|---|---|---|---|
| Oil 2, bbl/bbl | 0.611 | | 0.611 | |
| Emulsifier 3, bbl | 8 | | 8 | |
| Emulsifier 4, lb/bbl | 4 | | 4 | |
| High Temp. Emulsifier, lb/bbl | 0.5 | | 0.5 | |
| Lime, lb/bbl | 12 | | 12 | |
| Modified tannin 3, lb/bbl | 8 | | 8 | |
| Fluid loss polymer, lb/bbl | 4 | | 4 | |
| Polymer starch, lb/bbl | 1.5 | | 1.5 | |
| Water, bbl/bbl | 0.162 | | 0.162 | |
| $CaCl_2$ | 17.4 | | 17.4 | |
| Amorphous/fibrous material, lb/bbl | 0 | | 0 | |
| Organophilic clay 2, lb/bbl | 5 | | 5 | |
| Dimer/trimer fatty acid 1, lb/bbl | 0 | | 1.5 | |
| $CaCO_3$, lb/bbl | 30 | | 30 | |
| Weighting agent, lb/bbl | 109.7 | | 109.7 | |
| Clay, ppb | 30 | | 30 | |
| Rheology @ 150° F. | AHR-356° F. | ASA-392° F. | AHR-356° F. | ASA-392° F. |
| 600 rpm | 45 | 56 | 54 | 68 |
| 300 rpm | 24 | 30 | 31 | 37 |
| 200 rpm | 16 | 21 | 22 | 27 |
| 100 rpm | 77 | 12 | 15 | 17 |
| 6 rpm | 3 | 3 | 6 | 7 |
| 3 rpm | 3 | 3 | 6 | 7 |
| PV, cP | 21 | 26 | 23 | 31 |
| YP, lbs/100 ft² | 3 | 4 | 8 | 6 |
| GELS 10 sec, lbs/100 ft² | 3 | 5 | 10 | 13 |
| GELS 10 min, lbs/100 ft² | 5 | 8 | 12 | 18 |
| GELS 30 min, lbs/100 ft² | 6 | 9 | 13 | 17 |
| HPHT Fluid Loss 30 min, mL | 6.5 | 9.8 | 5 | 7.9 |
| HPHT Fluid Loss 2 × 30 min, mL | 13 | 19.6 | 10 | 15.8 |

The viscosity measurements of Sample 10, which included a dimer/trimer fatty acid, were similar to the measurements of Sample 9, which was free of a dimer/trimer fatty acid. The gel strength and yield point of Sample 10 were greater than that of Sample 9. The fluid loss measurements of Sample 10 were lower than the fluid loss observed for Sample 9. Sample 10 that included both a tannin modified with a tertiary amine and a dimer/trimer fatty acid had fluid loss that was more than 20 percent lower than the fluid loss of the sample with only the modified tannin. By comparison, the percent reductions in fluid loss observed in Examples 1–4 were lower for the fluids including a primary or secondary amine modified tannin.

Example 6

Fluid samples were prepared according to the formulations of Table 6, each using a tannin modified with a quaternary amine. The samples were tested for rheological properties and HPHT fluid loss.

TABLE 6

| Sample | 11 | | 12 | |
|---|---|---|---|---|
| Oil 2, bbl/bbl | 0.611 | | 0.611 | |
| Emulsifier 3, bbl | 8 | | 8 | |
| Emulsifier 4, lb/bbl | 4 | | 4 | |
| Lime, lb/bbl | 7 | | 7 | |
| Modified tannin 4, lb/bbl | 10 | | 10 | |
| Water, bbl/bbl | 0.162 | | 0.162 | |
| CaCl$_2$, lb/bbl | 17.4 | | 17.4 | |
| Gilsonite, lb/bbl | 4 | | 4 | |
| Amorphous/fibrous material, lb/bbl | 8 | | 8 | |
| Organophilic clay 2, lb/bbl | 5 | | 5 | |
| Dimer/trimer fatty acid 1, lb/bbl | 0.75 | | 0 | |
| CaCO$_3$, lb/bbl | 30 | | 30 | |
| Weighting agent, lb/bbl | 114.7 | | 114.7 | |
| Clay, ppb | 30 | | 30 | |
| Rheology @ 150° F. | AHR-356° F. | ASA-392° F. | AHR-356° F. | ASA-392° F. |
| 600 rpm | 72 | 151 | 47 | 77 |
| 300 rpm | 46 | 110 | 25 | 44 |
| 200 rpm | 36 | 93 | 18 | 31 |
| 100 rpm | 25 | 73 | 10 | 18 |
| 6 rpm | 11 | 34 | 3 | 3 |
| 3 rpm | 10 | 30 | 3 | 3 |
| PV, cP | 26 | 41 | 22 | 33 |
| YP, lbs/100 ft$^2$ | 20 | 69 | 3 | 11 |
| GELS 10 sec, lbs/100 ft$^2$ | 23 | 42 | 5 | 5 |
| GELS 10 min, lbs/100 ft$^2$ | 47 | 63 | 14 | 17 |
| GELS 30 min, lbs/100 ft$^2$ | 45 | 66 | 17 | 21 |
| HPHT Fluid Loss 30 min, mL | 1.2 | 2.1 | 3.2 | 2.2 |
| HPHT Fluid Loss 2 × 30 min, mL | 2.4 | 4.2 | 6.4 | 4.4 |

The viscosity measurements of Sample 11, which included a dimer/trimer fatty acid, were greater than the measurements of Sample 12, which was free of a dimer/trimer fatty acid. The gel strength and yield point of Sample 11 were greater than that of Sample 12. The fluid loss measurements after hot roll of Sample 11 were lower than the fluid loss observed for Sample 12. Sample 11 that included both a tannin modified with a quaternary amine and a dimer/trimer fatty acid had fluid loss that was more than 60 percent lower than the fluid loss of the sample with only the modified tannin. The fluid loss after static aging was similar for both samples, with the after static age data of Sample 11 lower. The higher temperature of static aging (392° F. versus 356° F. for hot roll) may impact the tannin and quaternary amine combination. By comparison, the fluid loss observed in Examples 1-5 were lower for both after hot roll and after static aging for the fluid including a primary, secondary, or tertiary amine modified tannin.

In some aspects, methods, systems, fluids for wellbore operations are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a composition comprising an oil, a modified tannin, a dimer fatty acid, an aqueous liquid, and an emulsifier, the composition being injectable into a wellbore.

Example 2 is the composition of example(s) 1, wherein the composition is an invert emulsion.

Example 3 is the composition of example(s) 1-2, wherein the oil is a diesel oil, a mineral oil, an ester, a paraffin, or a synthetic oil.

Example 4 is the composition of example(s) 1-3, wherein the modified tannin is a tannin modified with an amine, wherein the amine is a primary amine, a secondary amine, a tertiary amine, or a quaternary amine.

Example 5 is the composition of example(s) 4, wherein the modified tannin comprises between 5 wt. % and 35 wt. % of the amine.

Example 6 is the composition of example(s) 4 or 5, wherein the amine comprises a chain length from C14 to C24.

Example 7 is the composition of example(s) 1-6, further comprising a trimer fatty acid.

Example 8 is the composition of example(s) 1-7, wherein the aqueous liquid is selected from the group consisting of fresh water, sea water, brackish water, water soluble alcohol, or brine.

Example 9 is the composition of example(s) 1-8, further comprising at least one of a polymer, a viscosifying agent, a weighting agent, a salt, calcium carbonate, gilsonite, a clay, or a base.

Example 10 is the composition of example(s) 9, wherein the salt comprises calcium chloride.

Example 11 is the composition of example(s) 9 or 10, wherein the viscosifying agent comprises an amorphous fibrous material or an organophilic clay material.

Example 12 is the composition of example(s) 9-11, wherein the base comprises calcium hydroxide.

Example 13 is the composition of example(s) 1-12, wherein the composition has at least one of increased viscosity, increased gel strength, increased plastic viscosity, increased yield point, increased tau zero, or reduced fluid loss compared to a comparable composition free of a dimer fatty acid.

Example 14 is a system comprising: one or more pumps to position a composition into a wellbore, the composition comprising an oil, a modified tannin, a dimer fatty acid, an aqueous liquid, and an emulsifier.

Example 15 is the system of example(s) 14, further comprising a mixer to contact the modified tannin, the dimer fatty acid, the Example 16 is the system of example(s) 14 or 15, aqueous liquid, and the emulsifier with the oil to form the composition.

Example 17 is the system of example(s) 14-16, wherein the composition further comprises at least one of trimer fatty acid, a polymer, a viscosifying agent, a weighting agent, a salt, gilsonite, a clay, or a base.

Example 18 is the system of example(s) 14-17, further comprising a circulation pump to circulate the composition past a drill bit and return the composition and drill cuttings through the wellbore to the surface of the earth.

Example 18 is a method comprising: providing a composition comprising an oil, a modified tannin, a dimer fatty acid, an aqueous liquid, and an emulsifier; and contacting a wellbore with the composition.

Example 19 is the method of example(s) 18, wherein the modified tannin is modified with an amine, wherein the amine is a primary amine, a secondary amine, a tertiary amine, or a quaternary amine.

Example 20 is the method of example(s) 18 or 19, wherein the modified tannin comprises between 5 wt. % and 35 wt. % of the amine.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A composition comprising:
    an oil,
    a modified tannin, wherein the modified tannin is a water soluble tannin modified with an amine, wherein the modified tannin is hydrophobic and oil soluble, and wherein the amine is a primary amine, a secondary amine, or a tertiary amine,
    a dimer fatty acid,
    an aqueous liquid,
    and an emulsifier, the composition injected into a wellbore for fluid loss control, wherein the modified tannin and the dimer fatty acid provide a synergistic increase on fluid loss control properties of the composition.

2. The composition of claim 1, wherein the composition is an invert emulsion.

3. The composition of claim 1, wherein the oil is a diesel oil, a mineral oil, an ester, a paraffin, or a synthetic oil.

4. The composition of claim 1, wherein the composition is a shear thinning fluid.

5. The composition of claim 1, wherein the modified tannin comprises between 5 wt. % and 35 wt. % of the amine.

6. The composition of claim 1, wherein the amine comprises a chain length from C14 to C24.

7. The composition of claim 1, further comprising a trimer fatty acid.

8. The composition of claim 1, wherein the aqueous liquid is selected from the group consisting of fresh water, sea water, brackish water or brine.

9. The composition of claim 1, further comprising at least one of a polymer, a viscosifying agent, a weighting agent, a salt, calcium carbonate, gilsonite, a clay, or a base.

10. The composition of claim 1, further comprising at least one of calcium chloride, an amorphous fibrous material, an organophilic clay material, or calcium hydroxide.

11. The composition of claim 1, wherein the composition has at least one of increased viscosity, increased gel strength, increased plastic viscosity, increased yield point, increased tau zero, or reduced fluid loss compared to a composition comprising the oil, the modified tannin, the aqueous liquid, and the emulsifier and free of the dimer fatty acid.

12. A system comprising:
    one or more pumps to position a composition into a wellbore, the composition comprising:
    an oil,
    a modified tannin, wherein the modified tannin is a water soluble tannin modified with an amine, wherein the modified tannin is hydrophobic and oil soluble, and wherein the amine is a primary amine, a secondary amine, or a tertiary amine,
    a dimer fatty acid,
    an aqueous liquid, and
    an emulsifier, the composition positioned into the wellbore by the one or more pumps for fluid loss control, wherein the modified tannin and the dimer fatty acid provide a synergistic increase on fluid loss control properties of the composition.

13. The system of claim 12, further comprising a mixer to contact the modified tannin, the dimer fatty acid, the aqueous liquid, and the emulsifier with the oil to form the composition.

14. The system of claim 12, wherein the composition further comprises at least one of trimer fatty acid, a polymer, a viscosifying agent, a weighting agent, a salt, gisonite, a clay, or a base.

15. The system of claim 12, further comprising a circulation pump to circulate the composition past a drill bit and return the composition and drill cuttings through the wellbore to the surface of the earth.

16. A method comprising:
    providing a composition comprising an oil, a modified tannin, a dimer fatty acid, an aqueous liquid, and an emulsifier, wherein the modified tannin is a water soluble tannin modified with an amine, wherein the modified tannin is hydrophobic and oil soluble, and wherein the amine is a primary amine, a secondary amine or a tertiary amine; and
    contacting a wellbore with the composition and thereby increasing fluid loss control in the wellbore by a synergistic effect of the modified tannin and the dimer fatty acid.

17. The method of claim 16, wherein the modified tannin comprises between 5 wt. % and 35 wt. % of the amine.

* * * * *